(12) United States Patent
Kumamoto et al.

(10) Patent No.: US 8,077,140 B2
(45) Date of Patent: Dec. 13, 2011

(54) LIQUID CRYSTAL DISPLAY DEVICE

(75) Inventors: Yasuhiro Kumamoto, Osaka (JP); Takashi Uno, Osaka (JP)

(73) Assignee: Pansonic Corporation, Osaka (JP)

( * ) Notice: Subject to any disclaimer, the term of this patent is extended or adjusted under 35 U.S.C. 154(b) by 385 days.

(21) Appl. No.: 12/523,951

(22) PCT Filed: Dec. 28, 2007

(86) PCT No.: PCT/JP2007/075310
§ 371 (c)(1),
(2), (4) Date: Jul. 21, 2009

(87) PCT Pub. No.: WO2008/090722
PCT Pub. Date: Jul. 31, 2008

(65) Prior Publication Data
US 2010/0045590 A1    Feb. 25, 2010

(30) Foreign Application Priority Data
Jan. 23, 2007  (JP) ................. 2007-013122

(51) Int. Cl.
*G09G 3/36*   (2006.01)

(52) U.S. Cl. ............ 345/102; 345/211; 345/87; 345/84; 345/207; 349/58; 349/61; 349/70; 315/224; 315/308

(58) Field of Classification Search ............ 345/30, 345/55, 84, 87, 89, 99–100, 102, 204–206, 345/211; 349/58, 61, 70; 313/509; 362/31, 362/225, 260, 632; 315/224, 308
See application file for complete search history.

(56) References Cited

U.S. PATENT DOCUMENTS

| | | | |
|---|---|---|---|
| 5,939,835 A | 8/1999 | Takeda et al. | |
| 6,331,064 B1 | 12/2001 | Nishiyama et al. | |
| 7,207,710 B2 | 4/2007 | Kim | |
| 7,434,979 B2 | 10/2008 | Kim | |
| 2002/0027774 A1 | 3/2002 | Nishiyama et al. | |
| 2004/0156183 A1 | 8/2004 | Kim | |
| 2005/0243052 A1* | 11/2005 | Lim | 345/102 |
| 2006/0077659 A1 | 4/2006 | Nishiyama et al. | |

(Continued)

FOREIGN PATENT DOCUMENTS

EP        0802703       10/1997

(Continued)

OTHER PUBLICATIONS

Search report from E.P.O., mail date is Jan. 5, 2011.

(Continued)

*Primary Examiner* — Lun-Yi Lao
*Assistant Examiner* — Insa Sadio
(74) *Attorney, Agent, or Firm* — Greenblum & Bernstein, P.L.C.

(57) ABSTRACT

A liquid crystal panel module of a liquid crystal display device includes a liquid crystal display panel on its front side and an EEFL backlight on its back side within a metal frame. A metal chassis is arranged at the center of the metal frame on the back surface of the liquid crystal panel module. A power supply circuit board and a video signal processing board are mounted on the metal chassis. An inverter board is arranged on the metal frame near one side of the metal frame on the back surface. The power supply circuit board includes a noise filter, an active filter and an isolation transformer. The inverter board includes a step-up transformer.

11 Claims, 12 Drawing Sheets

U.S. PATENT DOCUMENTS

| | | |
|---|---|---|
| 2006/0268192 A1 | 11/2006 | Nishiyama et al. |
| 2007/0171181 A1* | 7/2007 | Hsu ............................ 345/102 |
| 2007/0195554 A1 | 8/2007 | Kim |
| 2008/0061689 A1 | 3/2008 | Ohkubo et al. |
| 2008/0284721 A1* | 11/2008 | Hasegawa .................... 345/102 |
| 2009/0046223 A1 | 2/2009 | Hashimotodani et al. |
| 2009/0115934 A1 | 5/2009 | Nishiyama et al. |
| 2009/0161041 A1 | 6/2009 | Hashimotodani et al. |

FOREIGN PATENT DOCUMENTS

| | | |
|---|---|---|
| JP | 9-283286 | 10/1997 |
| JP | 11-113269 | 4/1999 |
| JP | 2000-162593 | 6/2000 |
| JP | 2001-357991 | 12/2001 |
| JP | 2002-359092 | 12/2002 |
| JP | 2004-247277 | 9/2004 |
| JP | 2005-026154 | 1/2005 |
| JP | 2005-26154 | 1/2005 |
| JP | 2005-123008 | 5/2005 |
| JP | 2006-339813 | 12/2006 |

OTHER PUBLICATIONS

English language Abstract of JP 2006-339813, Dec. 14, 2006.
English language Abstract of JP 2001-357991, Dec. 26, 2001.
English language Abstract of JP 2005-26154, Jan. 27, 2005.
English language Abstract of JP 9-283286, Oct. 31, 1997.
English language Abstract of JP 11-113269, Apr. 23, 1999.
English language Abstract of JP 2002-359092, Dec. 13, 2002.
English language Abstract of JP 2005-123008, May 12, 2005.
English language Abstract of JP 2000-162593, Jun. 16, 2000.
English language Abstract of JP 2004-247277, Sep. 2, 2004.

* cited by examiner

LIQUID CRYSTAL DISPLAY DEVICE

TECHNICAL FIELD

The present invention relates to a liquid crystal display device including a liquid crystal display panel and a backlight.

BACKGROUND ART

Liquid crystal panel modules employed in liquid crystal display devices include backlights (see Patent Document 1, for example). In general, a plurality of cold cathode fluorescent lams (hereinafter referred to as CCFLs) or a plurality of external electrode fluorescent lamps (hereinafter referred to as EEFLs) are utilized as a light source for the backlight of the liquid crystal panel module. The backlight utilizing the plurality of CCFLs will be referred to as a CCFL backlight, and the backlight utilizing the plurality of EEFLs will be referred to as an EEFL backlight.

FIG. 11 is a schematic view showing the configuration of a general CCFL backlight.

As shown in FIG. 11, the CCFL backlight 500 includes a plurality of CCFLs 50 arranged parallel to one another. Each CCFL 50 has internal electrodes at its both ends. One ends of the plurality of CCFLs 50 are connected to step-up transformers 40 through ballast capacitors CB, respectively. The other ends of the plurality of CCFLs 50 are grounded. The ballast capacitors CB function as stabilizers.

As described above, in the CCFL backlight 500 of FIG. 11, each CCFL 50 needs the ballast capacitor CB and the step-up transformer 40. This increases the number of components, resulting in higher total cost of the components.

FIG. 12 is a schematic view showing the configuration of a general EEFL backlight.

As shown in FIG. 12, the EEFL backlight 600 includes a plurality of EEFLs 60 arranged parallel to one another. External electrodes are provided at both ends of each EEFL 60. One external electrodes 63A of the plurality of EEFLs 60 are connected to a common step-up transformer 70a, while the other external electrodes 63B of the plurality of EEFLs 60 are connected to a common step-up transformer 70b. The plurality of external electrodes 63A are integrally held by a lamp fixing plate made of metal, while the plurality of external electrodes 63B are also integrally held by a lamp fixing plate made of metal (See Patent Document 2, for example).

Since the external electrodes 63A, 63B of the EEFLs 60 function as stabilizers, the common step-up transformers 70a, 70b can be connected to the respective ends of the EEFLs 60, thus decreasing the number of components. On the other hand, a lighting voltage of the EEFLs 60 having the external electrodes is higher than a lighting voltage of the CCFLs 50 having the internal electrodes. Therefore, the step-up transformers 70a, 70b that differentially operate are connected to the respective ends of the plurality of EFFLs 60. Nevertheless, the EEFL backlight 600 employs fewer components in total than the CCFL backlight 500, resulting in reduced total cost of the components.

[Patent Document 1] JP 2000-162593 A
[Patent Document 2] JP 2004-247277 A

DISCLOSURE OF THE INVENTION

Problems to be Solved by the Invention

FIG. 13 is a schematic view showing one example of arrangement of circuit boards on a back surface of a conventional liquid crystal display device, and FIG. 14 is a block diagram showing one example of the circuit configuration of the conventional liquid crystal display device.

As shown in FIG. 13, the liquid crystal display device 100A includes a liquid crystal panel module 100. The liquid crystal panel module 100 includes a liquid crystal display panel (not shown) on its front side and the EEFL backlight 600 (see FIG. 14), described later, on its back side within a metal frame 700. The metal frame 700 is used for improving rigidity of the liquid crystal panel module 100 and causing the EEFL backlight 6 to stably and easily light up. A metal chassis 200 is provided on a back surface of the metal frame 700 of the liquid crystal panel module 100. A power supply circuit board 300 and a video signal processing board 400 are mounted on the metal chassis 200. The power supply circuit board 300 and the video signal processing board 400 on the metal chassis 200 are arranged at the center of the back surface of the liquid crystal panel module 100 to avoid complexity of power supply wiring and signal wiring. An inverter main board 501 and an inverter sub-board 502 are arranged on the metal frame 700 near both sides of the metal frame 700, respectively.

Note that FIG. 13 only shows a noise filter 310, an active filter 330 and an isolation transformer 340 included in the power supply circuit board 300, a step-up transformer 531 included in the inverter main board 501, and a step-up transformer 532 included in the inverter sub-board 502 out of circuit elements shown in FIG. 14, described later, while the other circuit elements are not shown.

The step-up transformer 531 of the inverter main board 501 is connected to the EEFL backlight 600 (FIG. 14) of the liquid crystal panel module 100 through a lamp lead 810, while the step-up transformer 532 of the inverter sub-board 502 is connected to the EEFL backlight 600 (FIG. 14) of the liquid crystal panel module 100 through a lamp lead 820. The lamp leads 810, 820 have the same length.

As shown in FIG. 14, the power supply circuit board 300 includes the noise filter 310, a rectifier circuit 320, the active filter 330, the isolation transformer 340 and a DC-DC (Direct Current-Direct Current) converter 350.

The noise filter 310 is connected to an AC power supply of 100 V through a connector CN310. The rectifier circuit 320, the active filter 330 and the isolation transformer 340 are connected in this order to the noise filter 310. A secondary ground terminal and a secondary output terminal of the isolation transformer 340 are connected to a ground line L0 and a power supply line L1, respectively, through a connector 320. A ground potential GND is applied to the ground line L0, and a power supply voltage V0 is applied to the power supply line L1.

A ground terminal and an input terminal of the DC-DC converter 350 are connected to the ground terminal and the output terminal of the isolation transformer 340, respectively. An output terminal of the DC-DC converter 350 is connected to a power supply line L2 through a connector CN320. The ground terminal of the isolation transformer 340 and the ground terminal of the DC-DC converter 350 are connected to the metal chassis 200. A power supply voltage Vc is applied to the power supply line L2.

The video signal processing board 400 includes a video signal processing circuit 410 and a backlight control amount processing circuit 420.

A ground terminal of the video signal processing circuit 410 and a ground terminal of the backlight control amount processing circuit 420 are connected to the ground line L0 through a connector CN410 while being connected to the metal chassis 200. A power supply terminal of the video signal processing circuit 410 is connected to the power supply line L2 through the connector CN410. An output terminal of the backlight control amount processing circuit 420 is connected to a signal line L3 through the connector CN410. A backlight control amount DIM is applied to the signal line L3. The backlight control amount DIM includes a lamp current set value and a PWM (Pulse-Width Modulation) dimming set value.

The inverter main board 501 includes a drive IC (Integrated Circuit) 510, a switching circuit 521, the step-up transformer 531 and a resonant capacitor 550 for current adjustment.

A ground terminal of the drive IC 510, a ground terminal of the switching circuit 521 and a secondary ground terminal of the step-up transformer 531 are connected to the ground line L0 through a connector CN510 while being connected to the metal frame 700 of the liquid crystal panel module 100. The metal frame 700 is connected to the metal chassis 200.

A power supply terminal and an input terminal of the drive IC 510 are connected to the power supply line L2 and the signal line L3, respectively, through the connector CN510. A drive pulse (rectangular signal) Pt is output to an output terminal of the drive IC 510. A power supply terminal of the switching circuit 521 is connected to the power supply line L1 through the connector CN510. A control terminal of the switching circuit 521 is connected to the output terminal of the drive IC 510.

A pair of primary input terminals of the step-up transformer 531 is connected to a pair of output terminals of the switching circuit 521. A secondary output terminal of the step-up transformer 531 is connected to the lamp lead 810 through a connector CN520. The resonant capacitor 550 is connected between the output terminal of the step-up transformer 531 and the ground terminal.

The inverter sub-board 502 includes a switching circuit 522, the step-up transformer 532 and a resonant capacitor 560.

A ground terminal of the switching circuit 522 and a secondary ground terminal of the step-up transformer 532 are connected to the ground line L0 through the connector CN540 and a power supply cable 900 while being connected to the metal frame 700 of the liquid crystal panel module 100.

A power supply terminal of the switching circuit 522 is connected to the power supply line L1 through the connector CN540 and the power supply cable 900. An input terminal of the switching circuit 521 is connected to the output terminal of the drive IC 510 through a connector CN560, and a connector CN530 of the inverter main board 501.

A pair of primary input terminals of the step-up transformer 532 is connected to a pair of output terminals of the switching circuit 522. A secondary output terminal of the step-up transformer 532 is connected to the lamp lead 820 through a connector CN550. The resonant capacitor 560 is connected between the output terminal of the step-up transformer 532 and the ground terminal.

The EEFL backlight 600 includes the plurality of EEFLs 60. The one external electrodes 63A of the plurality of EEFLs 60 are connected to the lamp lead 810, and the other external electrodes 63B are connected to the lamp lead 820. Parasitic capacitance 61 exists between each EEFL 60 and the metal frame 700.

As described above, the EEFL backlight 600 used in the liquid crystal display device needs fewer components than the CCFL backlight 500; however, further reduction in the number of components for additional cost reduction of components is desired to achieve a lower price of a liquid crystal display device.

An object of the present invention is to provide a liquid crystal display device of which price can further be reduced by reducing the number of components.

Means for Solving the Problems (1) According to an aspect of the present invention, a liquid crystal display device includes a liquid crystal panel module including a liquid crystal display panel and a backlight, a first circuit board that receives an external voltage from an external power supply through a power supply line, a second circuit board connected to the liquid crystal display panel, a third circuit board including first and second output terminals connected to the backlight, a rectifier circuit that rectifies the external voltage, a smoothing circuit that smoothes the voltage rectified by the rectifier circuit by switching operation, a first transformer that converts the voltage smoothed by the smoothing circuit into a first internal voltage, a voltage converter that converts the first internal voltage into a second internal voltage that is lower than the first internal voltage, a switching circuit that performs switching on the first internal voltage produced by the first transformer or the voltage smoothed by the smoothing circuit, a second transformer that converts an output voltage of the switching circuit into first and second drive voltages to cause the first and second drive voltages to be output from the first and second output terminals, and a panel drive circuit that is provided in the second circuit board and is operable by the second internal voltage to cause video to be displayed on the liquid crystal display panel, wherein the first and second output terminals are connected to the backlight through first and second conductor wires, respectively, and the rectifier circuit and the voltage converter are provided in the first circuit board, the switching circuit and the second transformer are provided in the third circuit board, and the smoothing circuit and the first transformer are provided in either the first circuit board or the third circuit board.

In the liquid crystal display device, the external voltage is rectified by the rectifier circuit provided in the first circuit board. The rectified voltage is smoothed by the smoothing circuit provided in the first or third circuit board. The smoothed voltage is converted into the first internal voltage by the first transformer provided in the first or third circuit board. In addition, the first internal voltage is converted into the second internal voltage by the voltage converter provided in the first circuit board. The panel drive circuit provided in the second circuit board is operable by the second internal voltage to cause video to be displayed on the liquid crystal display panel.

Moreover, the first internal voltage or the smoothed voltage is subjected to the switching by the switching circuit provided in the third circuit board. The output voltage of the switching circuit is converted into the first and second drive voltages by the second transformer provided in the third circuit board, and the voltages are output from the first and second output terminals. This causes the backlight to be driven.

As described above, both the switching circuit and the second transformer are provided in the common third circuit board. This eliminates the necessity of providing circuit elements and cables. Thus, the reduced number of the components enables a lower price.

(2) The liquid crystal panel module may include a conductive frame at least on its back side, a conductive chassis may be arranged on a back side of the conductive frame, the first circuit board and the second circuit board may be arranged on the conductive chassis, the third circuit board may be arranged in a position, which is different from a position of the conductive chassis, on the back side of the conductive frame, and the conductive chassis may be connected to the conductive frame, a ground terminal of the first circuit board and a ground terminal of the second circuit board may be connected to the conductive chassis, and a ground terminal of the third circuit board may be connected to the conductive frame.

In this case, the ground terminal of the first circuit board and the ground terminal of the second circuit board are connected to the conductive frame through the conductive chassis, and the ground terminal of the third circuit board is connected to the conductive frame. Thus, the ground terminal of the third circuit board is not directly connected to the ground terminals of the first circuit board and the second circuit board. This reduces a leakage current flowing from the backlight to the third circuit board through the first circuit board and a leakage current flowing from the backlight to the first circuit board through the third circuit board.

(3) The liquid crystal display device may further include a noise elimination circuit that eliminates noise of the power supply line, wherein the noise elimination circuit may be provided in the first circuit board.

In this case, change in the first and second internal voltages due to the noise superimposed on the external voltage can be prevented.

(4) The noise elimination circuit may include a noise filter having a capacitance connected between the power supply line and a ground terminal of the first circuit board. In this case, the noise superimposed on the external voltage is eliminated by the noise filter.

(5) The smoothing circuit may include an active filter. In this case, the voltage rectified by the rectifier circuit is smoothed by switching operation of the active filter.

(6) The smoothing circuit and the first transformer may be provided in the first circuit board, and the switching circuit may perform the switching on the first internal voltage produced by the first transformer.

In this case, the first and second drive voltages output from the second transformer are subjected to pulse width modulation. This causes luminance of the backlight to be controlled.

(7) The smoothing circuit and the first transformer may be provided in the third circuit board, and the switching circuit may perform the switching on the first internal voltage produced by the first transformer.

In this case, the voltage smoothed by the smoothing circuit is converted into the first internal voltage by the first transformer, the first internal voltage is subjected to the switching by the switching circuit, and the switched voltage is converted into the first and second drive voltages by the second transformer.

Here, the first transformer is provided in the third circuit board arranged in a position different from that of the conductive chassis. Thus, a leakage current from the backlight to the conductive frame flows into the first transformer of the third circuit board while hardly flowing into the first circuit board. This prevents noise due to the leakage current from being applied to the panel drive circuit of the second circuit board through the conductive chassis.

Moreover, the third circuit board is not directly connected to the conductive chassis, and therefore, the noise from the smoothing circuit and the first transformer of the third circuit board provided on the conductive chassis is prevented from being applied to the noise elimination circuit of the first circuit board.

As a result, appearance of noise in the video displayed on the liquid crystal display panel by the panel drive circuit is prevented.

(8) The first transformer may be provided in the first circuit board, the smoothing circuit may be provided in the third circuit board, and the switching circuit may perform the switching on the voltage smoothed by the smoothing circuit.

In this case, the voltage smoothed by the smoothing circuit is subjected to the switching by the switching circuit, and the voltage subjected to the switching is converted into the first and second drive voltages by the second transformer. Thus, the leakage current from the backlight to the conductive frame flows into the second transformer of the third circuit board while hardly flowing into the first circuit board. This prevents noise due to the leakage current from being applied to the panel drive circuit of the second circuit board through the conductive chassis.

Moreover, the third circuit board is not directly connected to the conductive chassis, and therefore, the noise from the smoothing circuit of the third circuit board provided on the conductive chassis is prevented from being applied to the noise elimination circuit of the first circuit board.

As a result, appearance of noise in the video displayed on the liquid crystal display panel by the panel drive circuit is prevented.

Furthermore, the voltage smoothed by the smoothing circuit is converted into the first and second drive voltages in one step by the second transformer, thus increasing conversion efficiency from the external voltage to the first and second drive voltages.

(9) The first and second conductor wires may be arranged along a surface of the conductive frame, a length of the second conductor wire may be longer than a length of the first conductor wire, a distance between the second conductor wire and the conductive frame may be set larger than a distance between the first conductor wire and the conductive frame such that a capacitance value formed between the first conductor wire and the conductive frame is equal to a capacitance value formed between the second conductor wire and the conductive frame.

In this case, asymmetry of leakage currents due to difference in length between the first conductor wire and the second conductor wire is improved even when the leakage currents are applied from the first and second conductor wires to the conductive frame.

(10) The first and second conductor wires may be arranged along a surface of the conductive frame, a length of the second conductor wire may be longer than a length of the first conductor wire, first and second capacitive components may be connected between the first output terminal and the conductive frame and between the second output terminal and the conductive frame, respectively, such that a capacitance value formed between the first conductor wire and the conductive frame is equal to a capacitance value formed between the second conductor wire and the conductive frame.

In this case, asymmetry of leakage currents due to difference in length between the first conductor wire and the second conductor wire is improved even when the leakage currents are applied from the first and second conductor wires to the conductive frame.

(11) The backlight may include a plurality of fluorescent lamps having first and second external electrodes, the first external electrodes of the plurality of fluorescent lamps may be connected to the first output terminal through the first conductor wire, and the second external electrodes of the plurality of fluorescent lamps may be connected to the second output terminal through the second conductor wire.

In this case, the plurality of fluorescent lamps of the backlight can be driven by the common second transformer. This further reduces the number of components provided in the third circuit board.

Effects of the Invention

According to the present invention, both the switching circuit outputting the first and second drive voltages and the second transformer are provided in the common third circuit board. This eliminates the necessity of providing circuit elements and cables. Thus, the reduced number of the components enables a lower price.

BRIEF DESCRIPTION OF THE DRAWINGS

BEST MODE FOR CARRYING OUT THE INVENTION (1) First Embodiment (1-1) Configuration of Liquid Crystal Display Device

As shown in FIG. 1, the liquid crystal display device 1A includes a liquid crystal panel module 1. The liquid crystal panel module 1 includes a liquid crystal display panel 1a on its front side and an EEFL backlight 6 (see FIG. 2), described later, on its back side within a metal frame 7. The metal frame 7 is used for improving rigidity of the liquid crystal panel module 1 and causing the EEFL backlight 6 to stably and easily light up. A metal chassis 2 is provided on a back surface of the metal frame 7 of the liquid crystal panel module 1. A power supply circuit board 3 and a video signal processing board 4 are mounted on the metal chassis 2.

Figure 1:
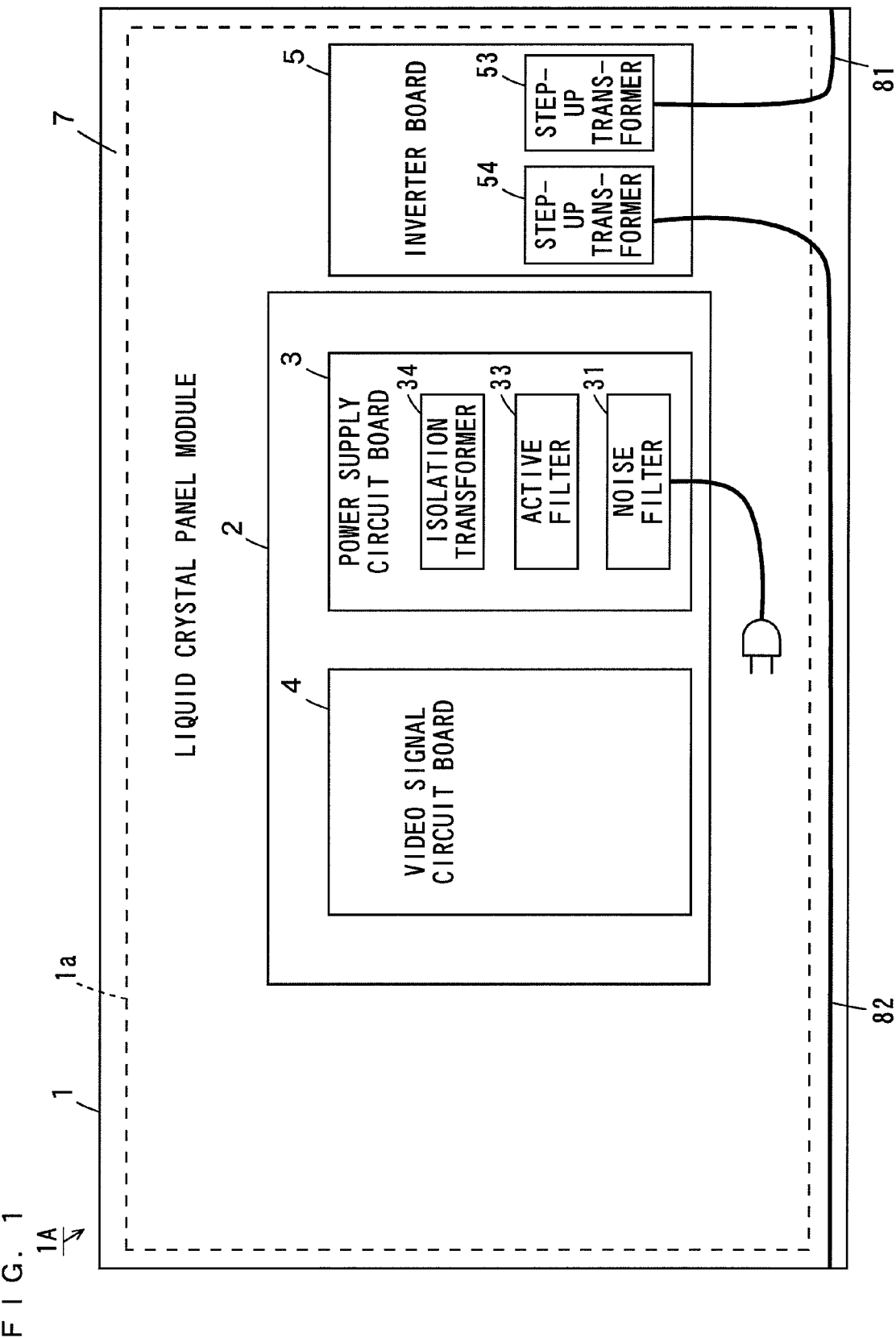
FIG. 1 is a schematic view showing arrangement of circuit boards on a back surface of a liquid crystal display device according to a first embodiment.

The power supply circuit board 3 and the video signal processing board 4 on the metal chassis 2 are arranged at the center of the back surface of the liquid crystal panel module 1 to avoid complexity of power supply wiring and signal wiring. That is, the power supply circuit board 3 and the video signal processing board 4 are provided at the center of the back surface of the liquid crystal panel module 1, thereby allowing simplification of wiring of the power supply circuit board 3 and the video signal processing board 4 connected to the liquid crystal display panel 1a and reduction in thickness of the liquid crystal display device 1A. In addition, the power supply circuit board 3 and the video signal processing board 4 are provided on the metal chassis 2, so that these boards are integrated and a ground conductor is used in common.

An inverter board 5 is arranged on the metal frame 7 near one side of the metal frame 7. Because of the reason described above, the inverter board 5 is not arranged at the center of the back surface of the liquid crystal panel module 1.

Note that FIG. 1 only shows a noise filter 31, an active filter 33 and an isolation transformer 34 included in the power supply circuit board 3 and step-up transformers 53, 54 included in the inverter board 5 out of circuit elements shown in FIG. 2, described later, while the other circuit elements are not shown.

The step-up transformer 53 of the inverter board 5 is connected to the EEFL backlight 6 (FIG. 2) of the liquid crystal panel module 1 through a short lamp lead 81, and the step-up transformer 54 of the inverter board 5 is connected to the EEFL backlight 6 (FIG. 2) of the liquid crystal panel module 1 through a long lamp lead 82.

Figure 2:
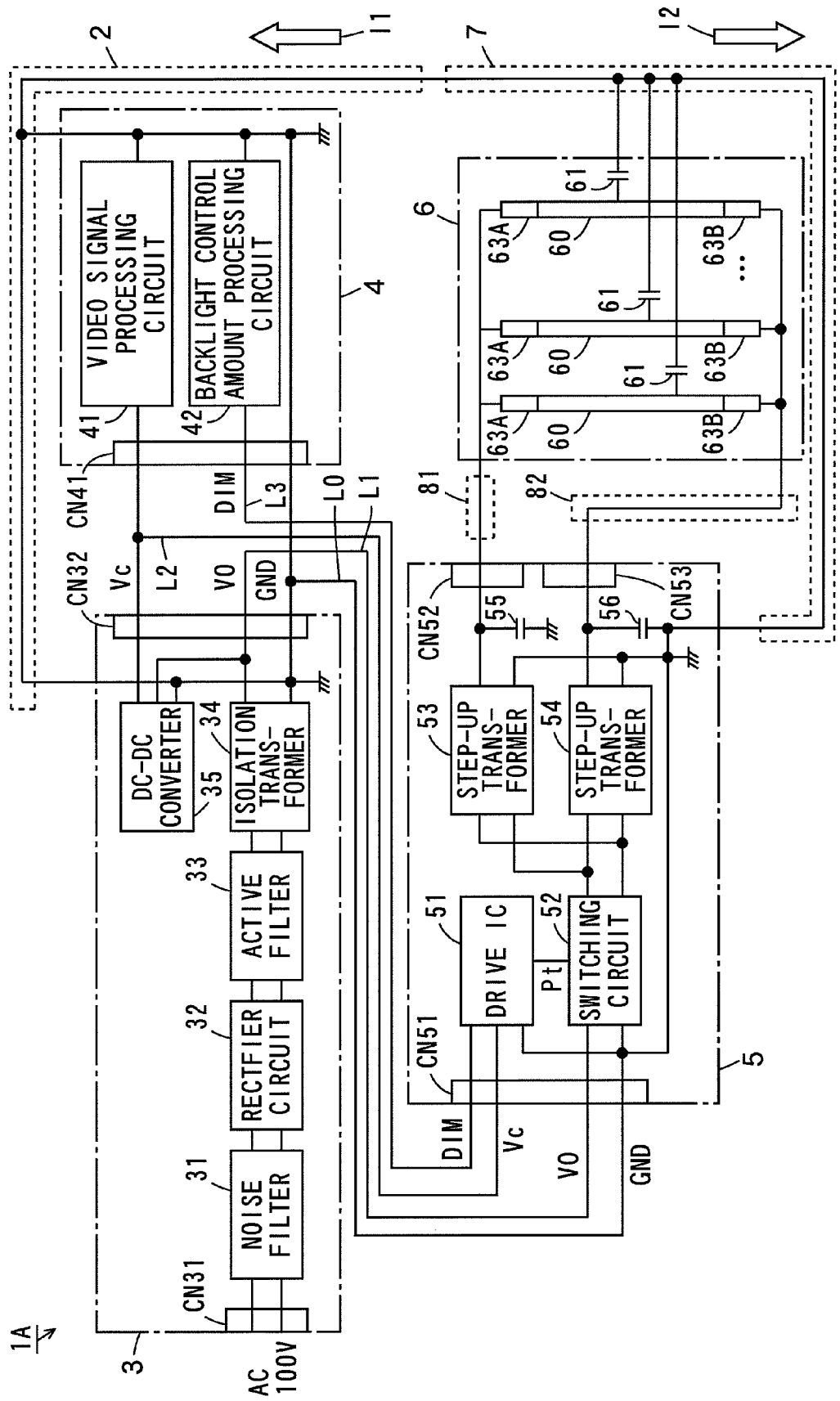
FIG. 2 is a block diagram showing the circuit configuration of the liquid crystal display device according to the first embodiment.

As shown in FIG. 2, the power supply circuit board 3 includes the noise filter 31, a rectifier circuit 32, the active filter 33, the isolation transformer 34 and a DC-DC (Direct Current-Direct Current) converter 35.

The noise filter 31 is connected to an AC power supply of 100 V through a connector CN31. The rectifier circuit 32, the active filter 33 and the isolation transformer 34 are connected in this order to the noise filter 31. A secondary ground terminal and a secondary output terminal of the isolation transformer 34 are connected to a ground line L0 and a power supply line L1, respectively, through a connector CN32. A ground potential GND is applied to the ground line L0, and a power supply voltage V0 is applied to the power supply line L1. The power supply voltage V0 is several dozen to several hundred volts, for example.

A ground terminal and an input terminal of the DC-DC converter 35 are connected to the ground terminal and the output terminal of the isolation transformer 34, respectively. An output terminal of the DC-DC converter 35 is connected to a power supply line L2 through the connector CN32. The ground terminal of the isolation transformer 34 and the ground terminal of the DC-DC converter 35 are connected to the metal chassis 2. A power supply voltage Vc is applied to the power supply line L2. The power supply voltage Vc is 3.3 V, for example.

The video signal processing board 4 includes a video signal processing circuit 41 and a backlight control amount processing circuit 42.

A ground terminal of the video signal processing circuit 41 and a ground terminal of the backlight control amount processing circuit 42 are connected to the ground line L0 through a connector CN41 while being connected to the metal chassis 2. A power supply terminal of the video signal processing circuit 41 is connected to the power supply line L2 through the connector CN41. An output terminal of the backlight control amount processing circuit 42 is connected to a signal line L3 through the connector CN41. The signal line L3 is provided with a backlight control amount DIM. The backlight control amount DIM includes a lamp current set value and a PWM (Pulse Width Modulation) dimming set value. The video signal processing circuit 41 causes video to be displayed on a screen of the liquid crystal display panel 1a of the liquid crystal panel module 1.

The inverter board 5 includes a drive IC (Integrated Circuit) 51, a switching circuit 52, the step-up transformers 53, 54 and resonant capacitors 55, 56 for current adjustment.

A ground terminal of the drive IC 51, a ground terminal of the switching circuit 52 and secondary ground terminals of the step-up transformers 53, 54 are connected to the ground line L0 through a connector CN51, while being connected to the metal frame 7 of the liquid crystal panel module 1. The metal frame 7 is connected to the metal chassis 2.

A power supply terminal and an input terminal of the drive IC 51 are connected to the power supply line L2 and the signal line L3, respectively, through the connector CN51. A drive pulse (rectangular signal) Pt is output to an output terminal of the drive IC 51. A power supply terminal of the switching circuit 52 is connected to the power supply line L1 through the connector CN51. A control terminal of the switching circuit 52 is connected to the output terminal of the drive IC 51.

A pair of primary input terminals of the step-up transformer 53 is connected to a pair of output terminals of the switching circuit 52. A secondary output terminal of the step-up transformer 53 is connected to the short lamp lead 81 through a connector CN52. The resonant capacitor 55 is connected between the output terminal of the step-up transformer 53 and the ground terminal. A pair of primary input terminals of the step-up transformer 54 is connected to the pair of output terminals of the switching circuit 52. A secondary output terminal of the step-up transformer 54 is connected to the long lamp lead 82 through a connector CN53. The resonant capacitor 56 is connected between the output terminal of the step-up transformer 54 and the ground terminal.

The EEFL backlight 6 includes a plurality of EEFLs 60. One external electrodes 63A of the plurality of EEFLs 60 are connected to the lamp lead 81, and the other external electrodes 63B are connected to the lamp lead 82. Parasitic capacitance 61 exists between each EEFL 60 and the metal frame 7.

The drive IC 51 of the inverter board 5 controls the switching circuit 52 by the drive pulse Pt based on the backlight control amount DIM applied from the backlight control amount processing circuit 42 of the video signal processing board 4. The switching circuit 52 performs switching on power supplied from the ground line L0 and the power supply line L1 based on the drive pulse Pt, and outputs voltages in opposite phase to each other to the pair of output terminals. The step-up transformers 53, 54 step-up the voltages in opposite phase output from the pair of output terminals of the switching circuit 52, and output the stepped-up voltages to the short lamp lead 81 and the long lamp lead 82, respectively, as first and second drive voltages. This causes the plurality of EEFLs 60 of the EEFL backlight 6 to be driven.

(1-2) Effects of Combination of Inverter Boards

Figure 13:
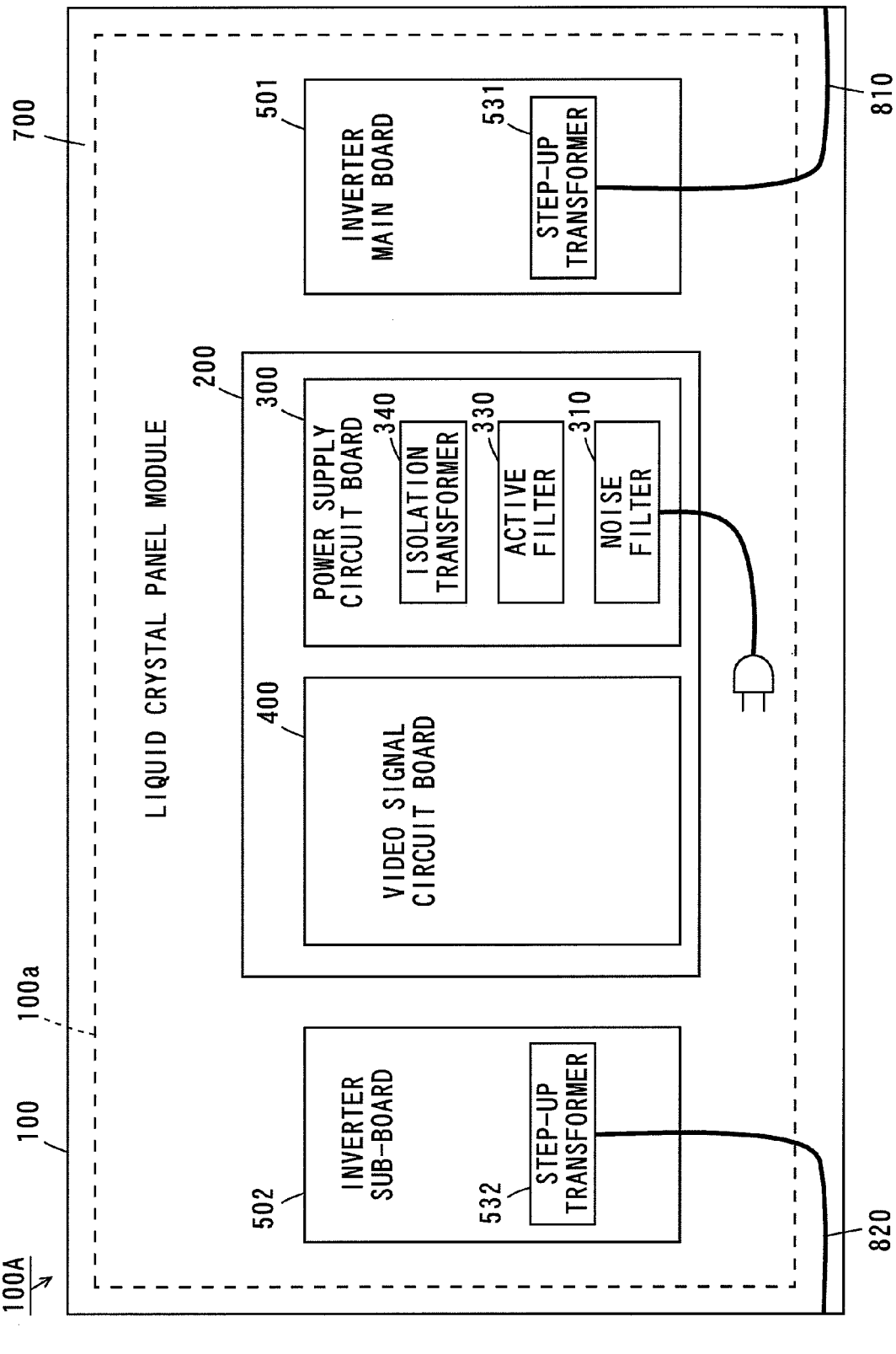
FIG. 13 is a schematic view showing one example of arrangement of circuit boards on a back surface of a conventional liquid crystal display device.
Figure 14:
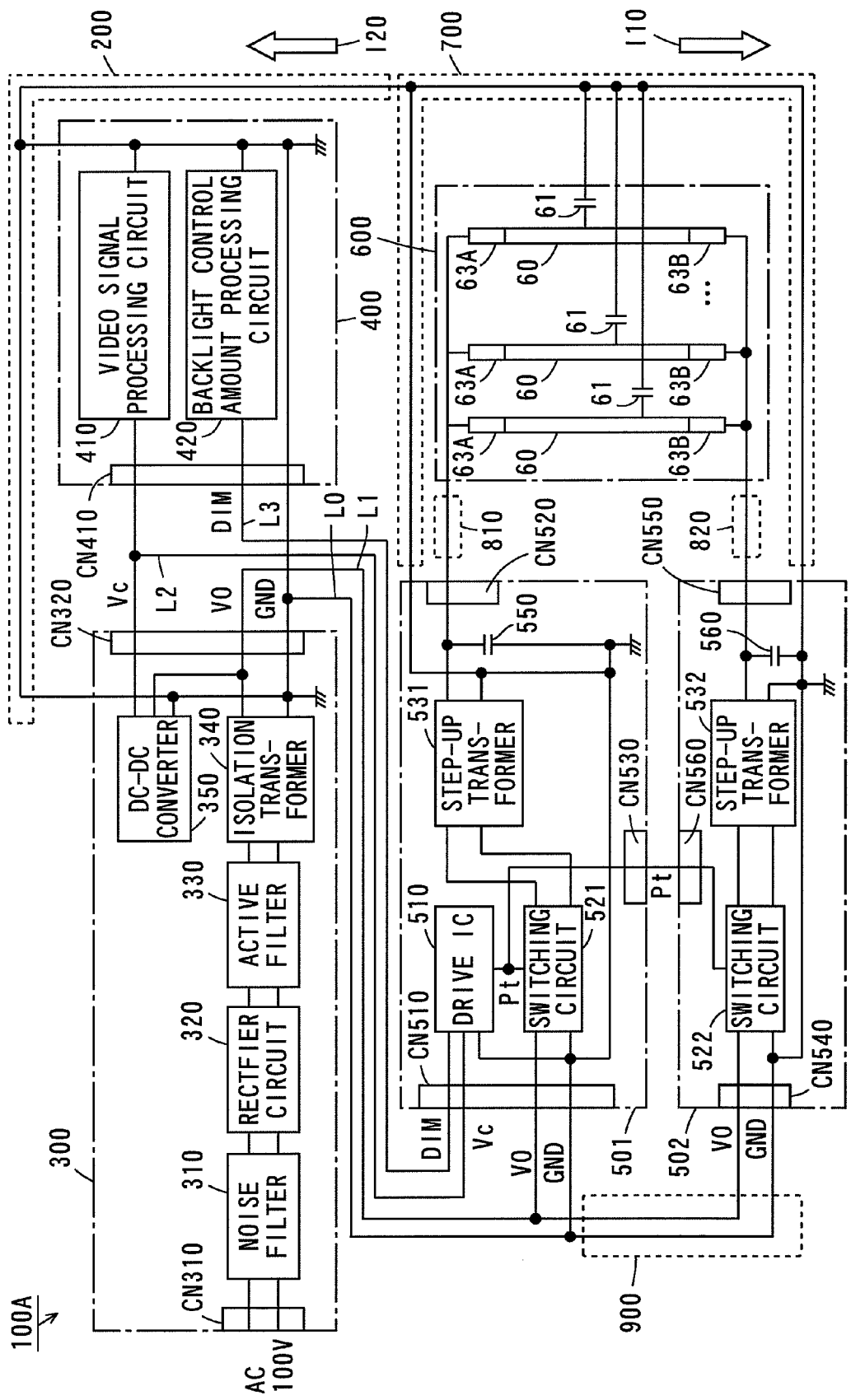
FIG. 14 is a block diagram showing one example of the circuit configuration of the conventional liquid crystal display device.

In the liquid crystal display device 1A according to the present embodiment, an inverter main board 501 and an inverter sub-board 502 in a liquid crystal display device of FIGS. 13 and 14 are combined into the common inverter board 5. In this case, the inverter board 5 includes the one switching circuit 52 instead of two switching circuits 521, 522 of FIG. 14. Moreover, a power supply cable 900 for supplying power to the inverter sub-board 502 of FIG. 14 is not necessary. Furthermore, a cable and connectors CN530, CN560 for supplying the drive pulse Pt from a drive IC 510 of FIG. 14 to the switching circuit 522 of the inverter sub-board 502 is not necessary.

(1-3) Problem Arising from Combination of the Inverter Boards and Measures Thereagainst Meanwhile, the lengths of the lamp leads 81, 82 connecting the step-up transformers 53, 54 of the inverter board 5 and the EEFL backlight 6 are not equal. Thus, a problem arises from the asymmetry of the lamp leads 81, 82.

Here, description is made of the problem arising from the asymmetry of the lamp leads 81, 82 and the measures thereagainst.

Figure 3:
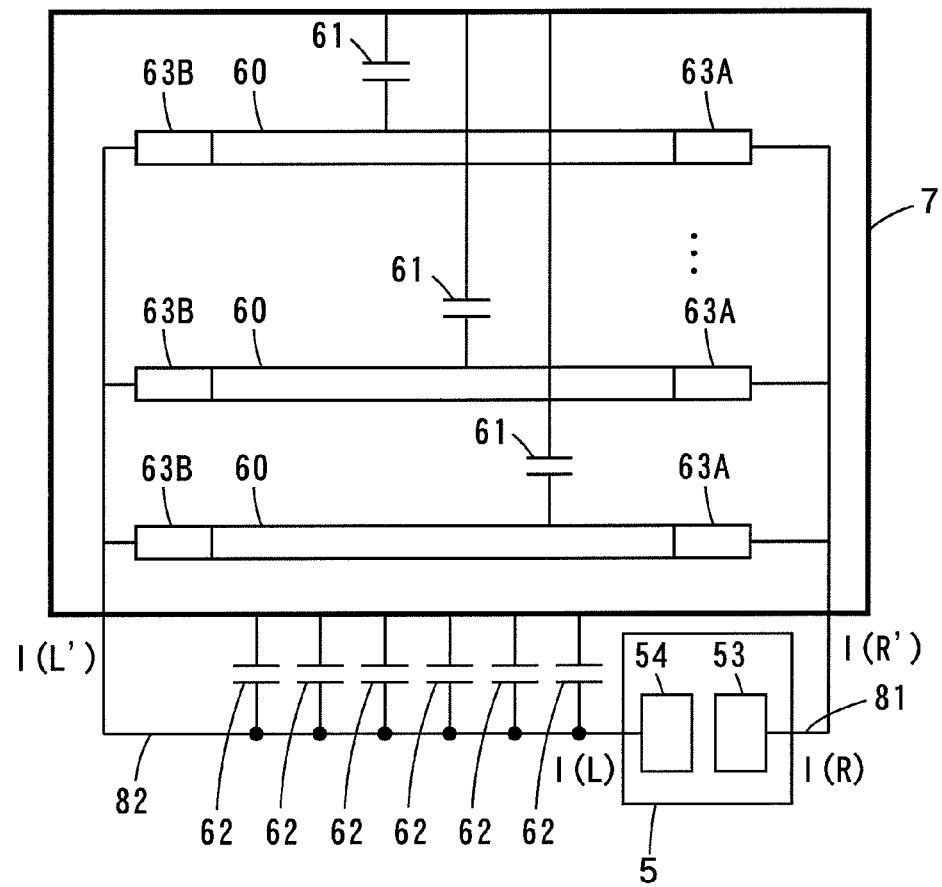
FIG. 3 is a diagram for explaining a problem arising from asymmetry of lamp leads.
Figure 4:
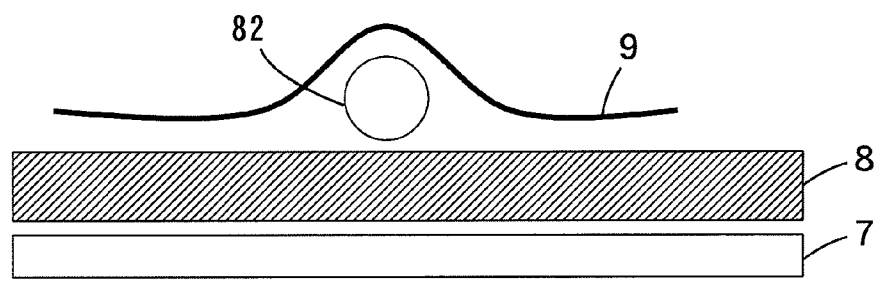
FIG. 4 is a diagram for explaining measures against the asymmetry of the lamp leads.

FIG. 3 is a diagram for explaining the problem arising from the asymmetry of the lamp leads 81, 82, and FIG. 4 is a diagram for explaining the measures against the asymmetry of the lamp leads 81, 82.

As shown in FIG. 3, the external electrodes 63A of the EEFLs 60 of the EEFL backlight 6 and the step-up transformer 53 of the inverter board 5 are connected through the short lamp lead 81, and the external electrodes 63B of the EEFLs 60 and the step-up transformer 54 of the inverter board 5 are connected through the long lamp lead 82.

Parasitic capacitance hardly exists between the short lamp lead 81 and the metal frame 7. This causes a leakage current to hardly flow from the short lamp lead 81 to the metal frame 7. In this case, a lamp current I (R') supplied to the external electrodes 63A of the EEFLs; 60 are substantially equal to an output current I (R) from the step-up transformer 53.

Meanwhile, the long lamp lead 82 is provided along the surface of the metal frame 7. Therefore, parasitic capacitance 62 exists between the lamp lead 82 and the metal frame 7. This causes a leakage current not involved in lighting of the EEFLs 60 to flow from the long lamp lead 82 to the metal frame 7 through the parasitic capacitance 62. In this case, a lamp current I (L') supplied to the external electrodes 63B of the EEFLs 60 is smaller than an output current I (L) from the step-up transformer 54.

As described above, magnitudes of the lamp currents I (R'), I (L') supplied to the external electrodes 63A, 63B of the EEFLs 60 are asymmetrical. This lowers luminance of the EEFLs 60. Therefore, the asymmetry of the lamp currents I (R'), I (L') is improved using the following method.

As shown in FIG. 4, in a first method, an isolator 8 having a certain thickness is arranged on the metal frame 7 that is a conductive material, and the long lamp lead 81 is arranged on the isolator 8. The lamp lead 82 is fixed to the isolator 8 with tape 9. Alternatively, the long lamp lead 82 may be mounted on the metal frame 7 so as to be spaced apart from the surface of the metal frame 7 by a predetermined distance. Meanwhile, the short lamp lead 81 is arranged on the metal frame 7 without an isolator sandwiched therebetween. Alternatively, the short lamp lead 81 is arranged on the metal frame 7 with an isolator having a smaller thickness than that of the isolator 8 sandwiched therebetween.

Accordingly, the parasitic capacitance between the long lamp lead 82 and the metal frame 7 is reduced. This reduces the leakage current from the long lamp lead 82 to the metal frame 7, resulting in improvement of the asymmetry of the lamp currents I (R'), I (L').

In a second method, capacitance values of the resonant capacitors 55, 56 of FIG. 2 are set such that the output current I (L) of the step-up transformer 54 is larger than the output current I (R) of the step-up transformer 53. In other words, the capacitance values of the resonant capacitors 55, 56 are set such that the output current I (R) of the step-up transformer 53, the lamp current I (R') of the external electrodes 63A, the output current I (L) of the step-up transformer 54 and the lamp current I (L') of the external electrodes 63B satisfy the following relationship:

$$I(L) > I(L') = I(R) = I(R')$$

In this manner, the asymmetry of the lamp currents I (R'), I (L') is modified. Note that capacitors other than the resonant capacitors 53, 54 may be connected between the output terminals of the step-up transformers 53, 54 of the inverter board 5 and the ground terminal, so that the asymmetry of the lamp currents I (R'), I (L') is modified.

(1-4) Effects of the First Embodiment

In the liquid crystal display device 1A according to the present embodiment, as described above, the inverter main board 501 and the inverter sub-board 502 in the liquid crystal display device 100A of FIGS. 13 and 14 are combined into the common inverter board 5, which includes the one switching circuit 52. In addition, the power supply cable 900 for supplying power to the inverter sub-board 502 of FIG. 14 is not necessary. Furthermore, the cable and the connectors CN530, CN560 for supplying the drive pulse Pt from the drive IC 510 of FIG. 14 to the switching circuit 522 of the inverter sub-board 502 is not necessary. In this manner, the reduced number of components allows cost reduction of the components.

(2) Second Embodiment

In a liquid crystal display device according to a second embodiment described below, influences of the leakage current from the EEFLs 60 of the EEFL backlight 6 to the metal frame 7 are reduced. Hereinafter, the leakage current from the EEFLs 60 to the metal frame 7 is referred to as a lamp leakage current.

(2-1) Influences of the Leakage Current

Figure 5:
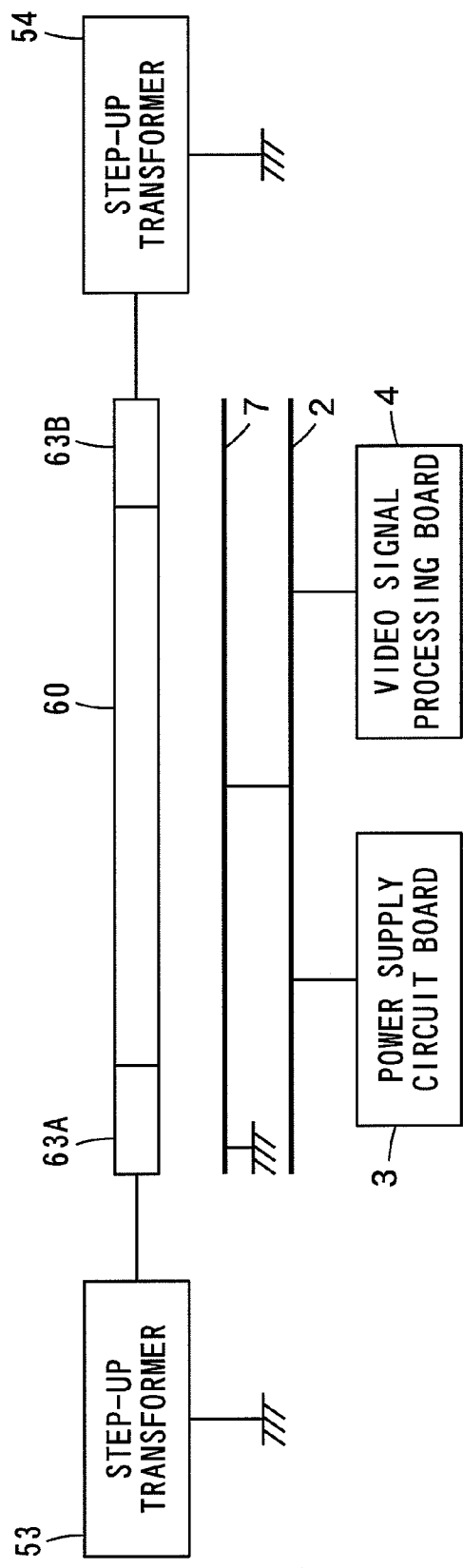
FIG. 5 is a diagram for explaining influences of a lamp leakage current.
Figure 6:
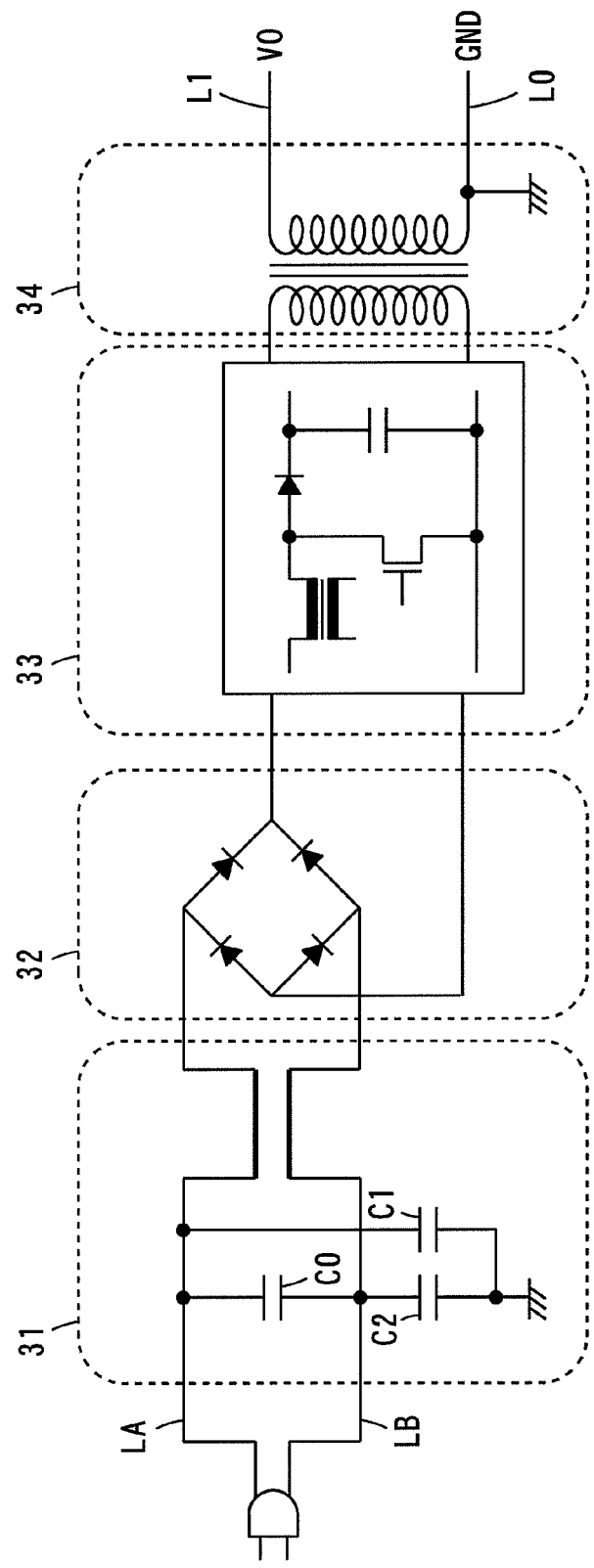
FIG. 6 is a diagram for explaining influences of the lamp leakage current on a noise filter.

First, description is made of influences of the lamp leakage current while referring to FIGS. 2, 5 and 6. FIG. 5 is a diagram for explaining the influences of the lamp leakage current.

As shown in FIG. 5, the EEFLs 60 are arranged to be opposite to the metal frame 7, and the metal chassis 2 is arranged on the metal frame 7 in the liquid crystal display panel 1A of FIG. 2. The power supply circuit board 3 and the video signal processing board 4 are arranged on the metal chassis 2. The ground terminals of the power supply circuit board 3 and the video signal processing board 4 are connected to the metal frame 7 through the metal chassis 2.

In the liquid crystal display device 1A of FIG. 2, the lamp leakage current is applied from the EEFLs 60 of the EEFL backlight 6 to the metal frame 7 through the parasitic capacitance 61. Part of the lamp leakage current I2 flows into the ground terminals of the step-up transformers 53, 54 of the inverter board 5. Part of the lamp leakage current I1 flows into the isolation transformer 34 of the power supply circuit board 3 through the metal frame 7 and the metal chassis 2.

Particularly, the external electrodes 63A, 63B of the plurality of EEFLs 60 are opposite to the metal frame 7 in the EEFL backlight 6. The external electrodes 63A, 63B of the plurality of EEFLs 60 are integrally held by a pair of lamp fixing plates of metal arranged on the metal frame 7. Therefore, the parasitic capacitance 61 between the metal frame 7 and the external electrodes 63A, 63B is large. A lighting voltage of the EEFL 60 is about 800 to 1000 V, for example, and a lighting voltage of a CCFL is 500 to 800 V, for example. The lighting voltage of the EEFL 60 is higher than that of the CCFL. Furthermore, all of the EEFLs 60 are driven with voltages in the same phase in the EEFL backlight 6. In this case, the lamp leakage currents are simultaneously generated in all the EEFLs 60. This results in a large lamp leakage current from the EEFL backlight 6.

The metal chassis 2 has impedance, and therefore the lamp leakage current flowing from the metal frame 7 into the metal chassis 2 causes a potential difference to occur in given different positions of the metal chassis 2. For example, the potential difference occurs between a portion of the metal chassis 2 to which the ground terminal of the power supply circuit board 3 of FIG. 2 is connected and a portion of the metal chassis 2 to which the ground terminal of the video signal processing board 4 is connected. Meanwhile, the ground terminal of the power supply circuit board 3 and the ground terminal of the video signal processing board 4 are connected through the ground line L0. Thus, the lamp leakage current flowing into the isolation transformer 34 generates noise, which flows into the ground terminal of the video signal processing board 4 through the metal chassis 2. This causes the ground potential GND of the video signal processing circuit 41 to change. As a result, noise may appear in video displayed on the screen of the liquid crystal display panel 1a by the video signal processing circuit 41.

The lamp leakage current flowing into the isolation transformer 34 also affects the noise filter 31 of the power supply circuit board 3. FIG. 6 is a diagram for explaining influences of the lamp leakage current to the noise filter 31.

In FIG. 6, the noise filter 31 of the power supply circuit board 3 removes noise on AC (Alternate Current) lines LA, LB. The noise filter 31 includes a capacitor C0 connected between the AC lines LA, LB, a capacitor C1 connected between the AC line LA and the ground terminal (the metal chassis 2) and a capacitor C2 connected between the AC line LB and the ground terminal (the metal chassis 2).

The rectifier circuit 32 rectifies an alternate current output from the noise filter 31, and outputs a pulsating flow. The active filter 33 outputs a direct current by performing switching on the pulsating flow output from the rectifier circuit 32 at a frequency of several dozen kHz to smooth the pulsating flow. The power supply voltage V0 of several dozen to several hundred volts is applied to the power supply line L1 from the secondary output terminal of the isolation transformer 34.

As described above, the AC lines LA, LB of the noise filter 31 are connected to the secondary ground terminal of the isolation transformer 34 through the capacitors C1, C2 and the metal chassis 2. Accordingly, the noise generated by the lamp leakage current flowing into the isolation transformer 34 is applied to the AC lines LA, LB of the noise filter 31 as AC line noise through the metal chassis 2.

In the liquid crystal display device 1A of FIG. 2, the noise filter 31, the active filter 33 and the isolation transformer 34 are provided in the power supply circuit board 3. In this case, the noise filter 31 is affected by leakage flux from the isolation transformer 34. This causes the noise occurred in the isolation transformer 34 to be applied to the noise filter 31 as the AC line noise because of the leakage flux.

Furthermore, in the liquid crystal display device 1A of FIG. 2, the noise filter 31, the active filter 33 and the isolation transformer 34 are provided in the power supply circuit board 3, and therefore high-frequency noise caused by switching operation of the active filter 33 is applied to the noise filter 31 as the AC line noise.

This may result in appearance of noise in video displayed on the screen of the liquid crystal display panel 1a by the video signal processing circuit 41.

In the liquid crystal display device according to the second embodiment, the following configuration reduces the influences of the lamp leakage current.

(2-2) Configuration of the Liquid Crystal Display Device

Figure 7:
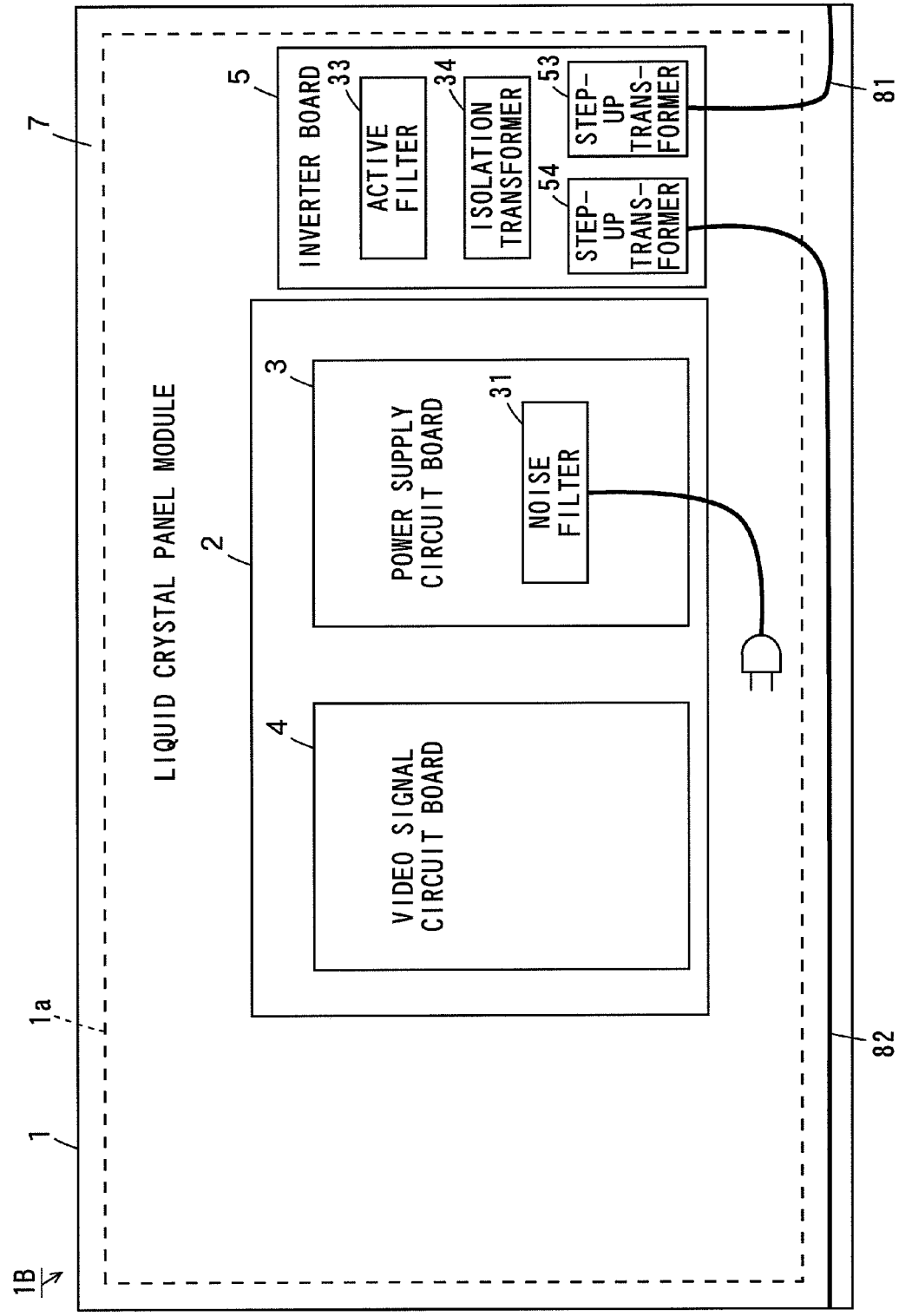
FIG. 7 is a schematic view showing arrangement of circuit boards on a back surface of a liquid crystal display device according to a second embodiment.
Figure 8:
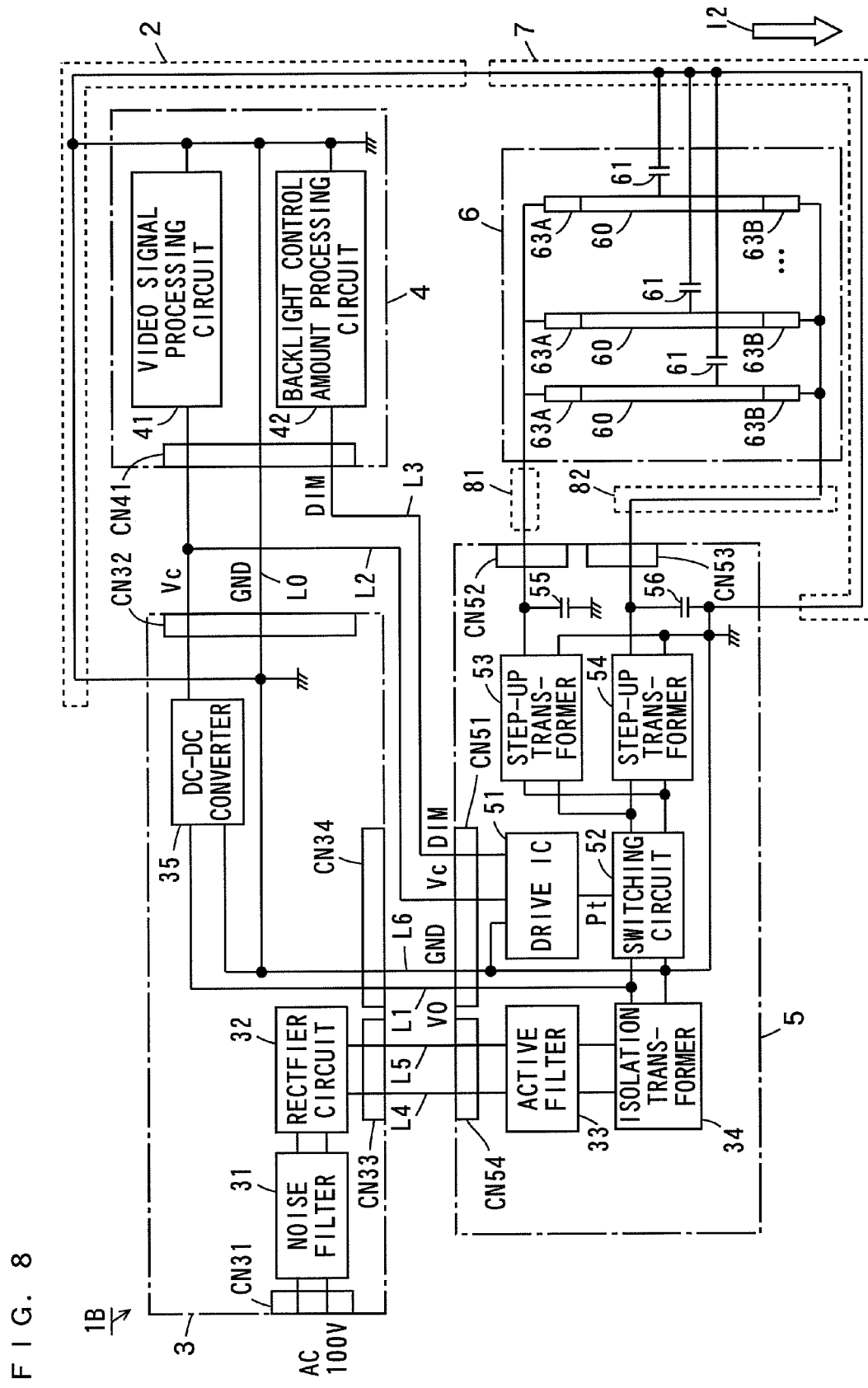
FIG. 8 is a block diagram showing the circuit configuration of the liquid crystal display device according to the second embodiment.

FIG. 7 is a schematic view showing arrangement of the circuit boards on the back surface of the liquid crystal display device according to the second embodiment, and FIG. 8 is a block diagram showing the circuit configuration of the liquid crystal display device according to the second-embodiment.

The liquid crystal display device 1B according to the second embodiment is different from the liquid crystal display device 1A according to the first embodiment in the following points.

As shown in FIG. 7, the active filter 33 and the isolation transformer 34 are provided on the inverter board 5. Note that FIG. 7 only shows the noise filter 31 included in the power supply circuit board 3, the active filter 33, the isolation transformer 34 and the step-up transformers 53, 54 included in the inverter board 5 out of circuit elements shown in FIG. 8, described later, while the other circuit elements are not shown.

As shown in FIG. 8, the power supply circuit board 3 includes the noise filter 31, the rectifier circuit 32 and the DC-DC converter 35. The inverter board 5 includes the active filter 33, the isolation transformer 34, the drive IC 51, the switching circuit 52, the step-up transformers 53, 54 and the resonant capacitors 55, 56 for current adjustment.

Note that the configurations of the video signal processing board 4 and the EEFL backlight 6 are the same as those shown in FIG. 2.

A pair of output terminals of the rectifier circuit 32 of the power supply circuit board 3 is connected to power supply lines L4, L5, respectively, through the connector CN33. The input terminal of the DC-DC converter 35 is connected to the power supply line L1 through a connector CN34. The ground terminal of the DC-DC converter 35 is connected to ground lines L0, L6. The ground potential GND is applied to the ground line L6.

A pair of input terminals of the active filter 33 of the inverter board 5 is connected to the power supply lines L4, L5, respectively, through a connector CN54, and a pair of output terminals thereof are connected to a pair of primary terminals of the isolation transformer 34. The secondary output terminal of the isolation transformer 34 is connected to the power supply terminal of the switching circuit 52 while being connected to the power supply line L1 through the connector CN51. The secondary ground terminal of the isolation transformer 34 is connected to the ground terminal of the drive IC 51, the ground terminal of the switching circuit 52, the secondary ground terminals of the step-up transformers 53, 54 and the metal frame 7 while being connected to the ground line L6 through the connector CN51.

(2-3) Effects of the Second Embodiment

In the liquid crystal display device 1B according to the present embodiment, the isolation transformer 34 is provided in the inverter board 5 outside the metal chassis 2. Accordingly, the lamp leakage current I2 from the EEFL backlight 6 to the metal frame 7 flows into the isolation transformer 34 of the inverter board 5 while hardly flowing into the power supply circuit board 3. In this case, noise occurring in the isolation transformer 34 is hardly applied to the video signal processing circuit 41, because the isolation transformer 34 is outside the metal chassis 2.

The isolation transformer 34 is not directly connected to the metal chassis 2. Therefore, the noise occurring in the isolation transformer 34 is prevented from being applied to the AC lines LA, LB of the noise filter 31 as the AC line noise through the metal chassis 2.

Since the isolation transformer 34 is not provided in the power supply circuit board 3, the noise filter 31 is prevented from being affected by the leakage flux from the isolation transformer 34. This prevents the noise occurring in the isolation transformer 34 from being applied to the noise filter 31 as the AC line noise because of the leakage flux.

High-frequency noise caused by the switching operation of the active filter 33 is prevented from being applied to the noise filter 31 as the AC line noise, because the active filter 33 is not provided in the power supply circuit board 3.

The video signal processing circuit 41 of the video signal processing board 4 is prevented from being affected by the leakage currents from the lamp leads 81, 82 to the metal frame 2.

As a result, the appearance of noise in video displayed on the screen of the liquid crystal display panel 1a by the video signal processing circuit 41 is prevented.

Also in the present embodiment, the inverter main board 501 and the inverter sub-board 502 in the liquid crystal display device 100A of FIGS. 13 and 14 are combined into the common inverter board 5, which includes the one switching circuit 52. Moreover, the power supply cable 900 for supplying power to the inverter sub-board 502 of FIG. 14 is not necessary. Furthermore, the cable and the connectors CN530, CN560 for supplying the drive pulse Pt from the drive IC 510 of FIG. 14 to the switching circuit 522 of the inverter sub-board 502 is not necessary. In this manner, the reduced number of components allows cost reduction of the components.

(3) Third Embodiment

Also in a liquid crystal display device according to a third embodiment described below, influences of the lamp leakage current is reduced similarly to the liquid crystal display device according to the second embodiment.

(3-1) Configuration of the Liquid Crystal Display Device

Figure 9:
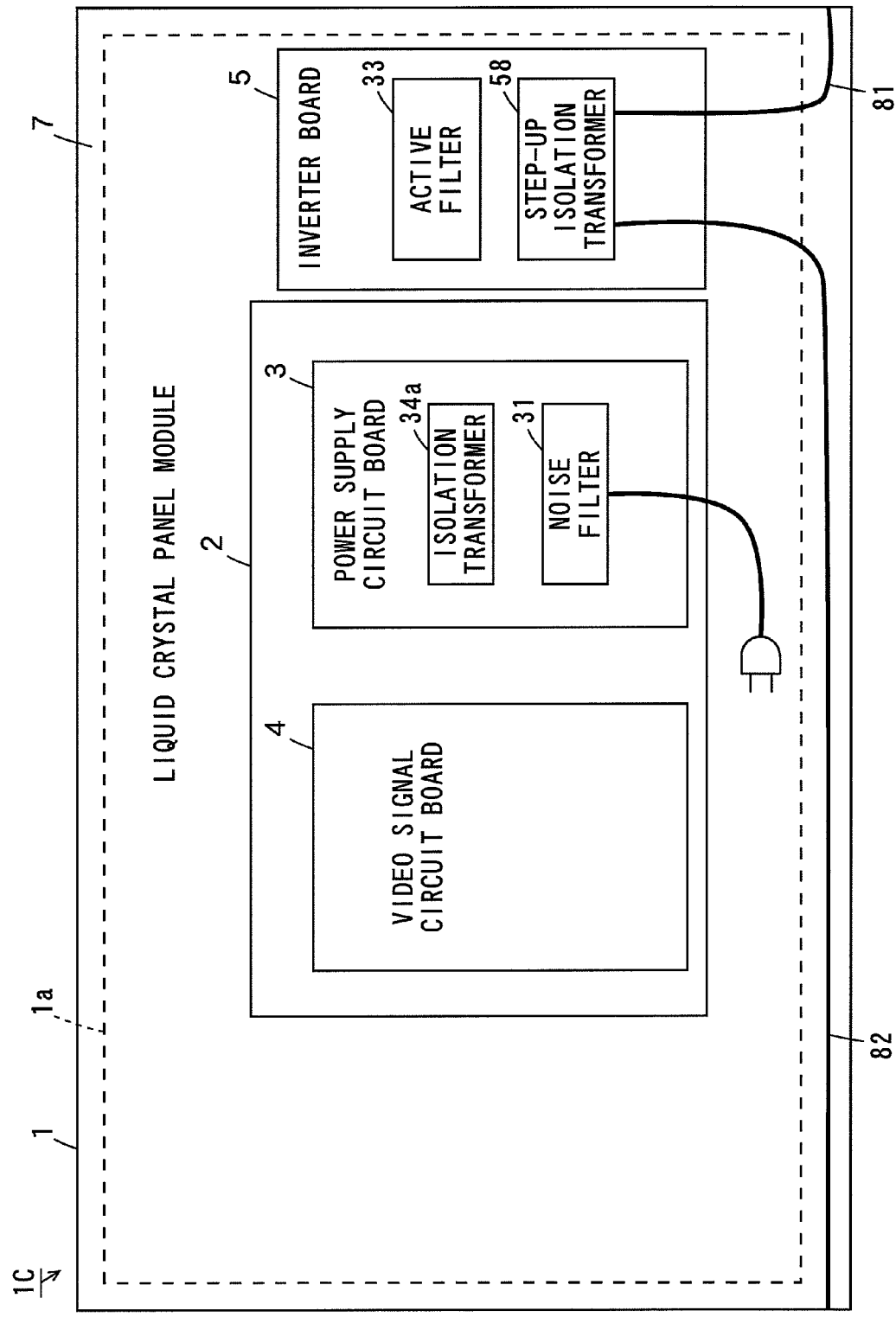
FIG. 9 is a schematic view showing arrangement of circuit boards on a back surface of a liquid crystal display device according to a third embodiment.
Figure 10:
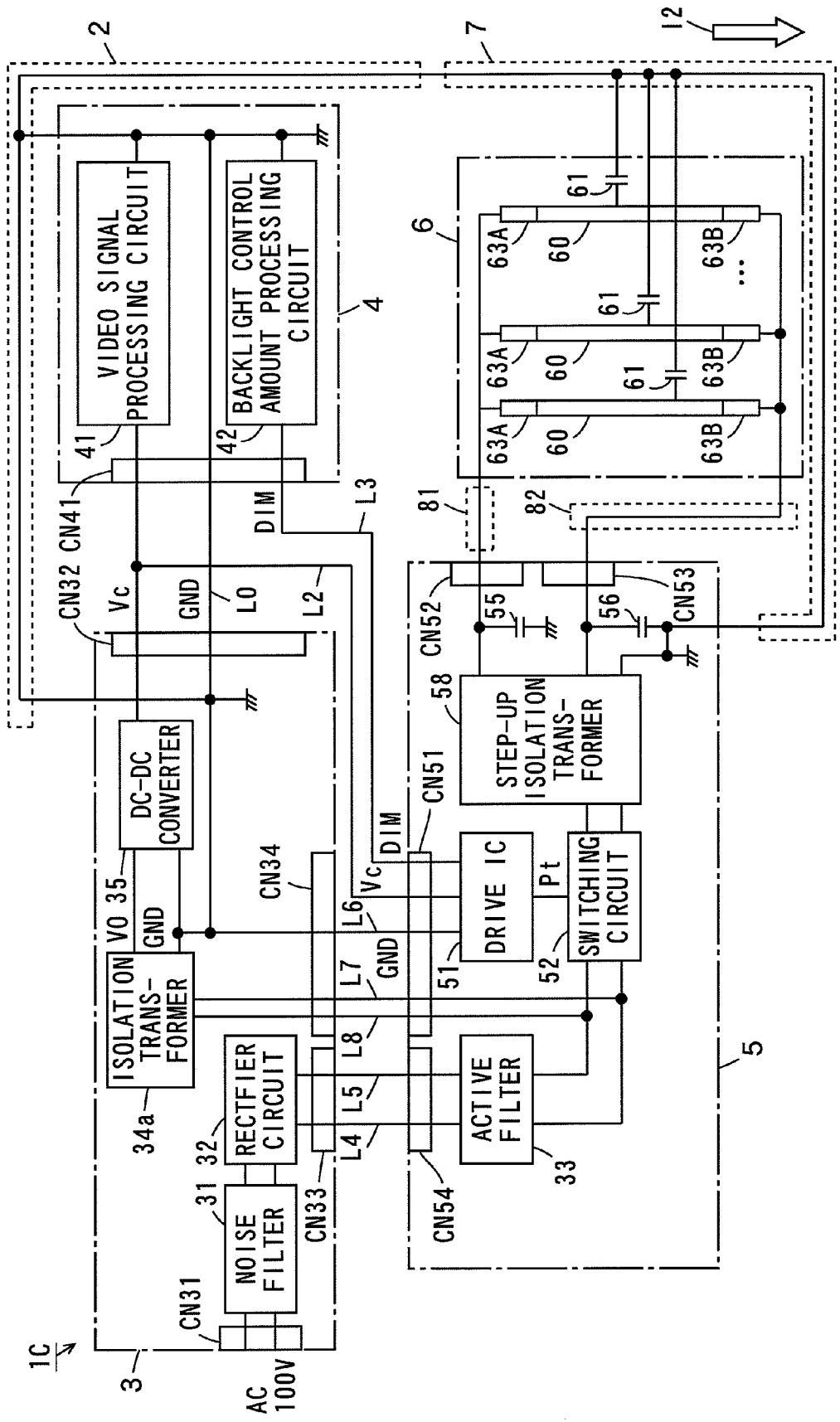
FIG. 10 is a block diagram showing the circuit configuration of the liquid crystal display device according to the third embodiment.
Figure 11:
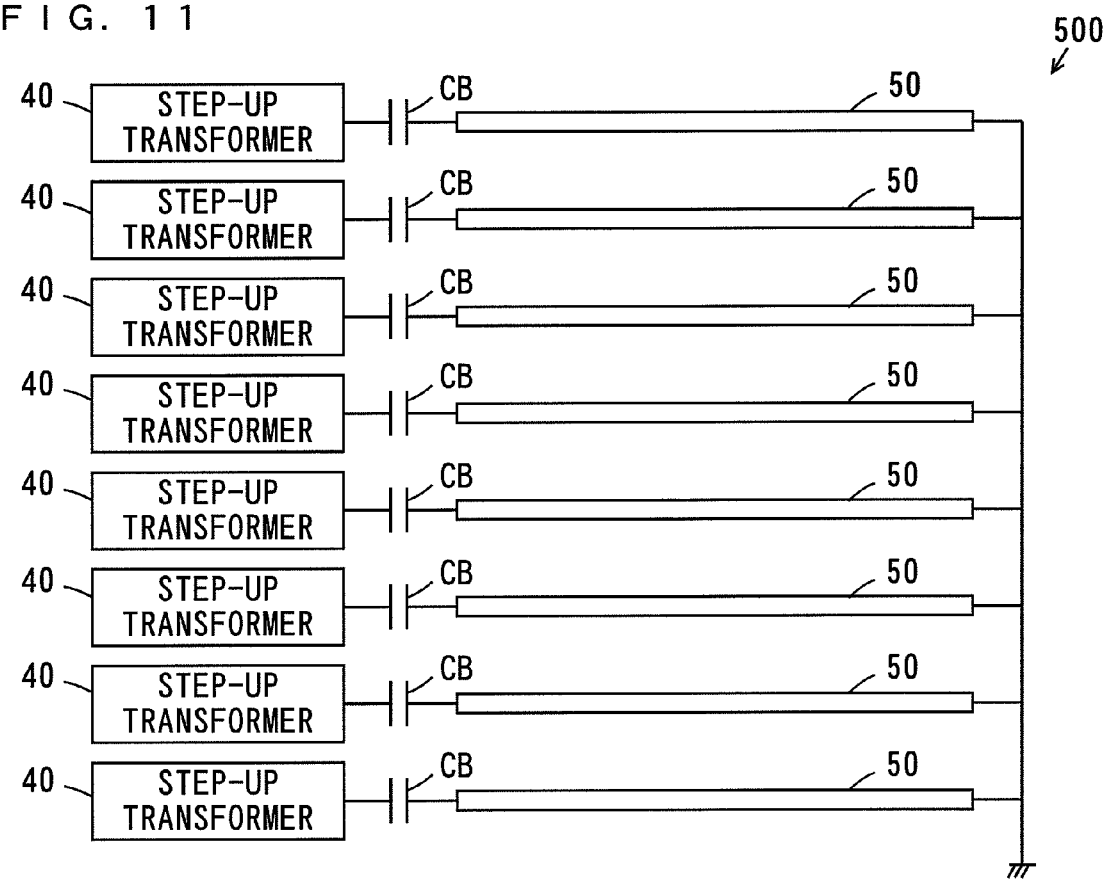
FIG. 11 is a schematic view showing the configuration of a general EEFL backlight.
Figure 12:
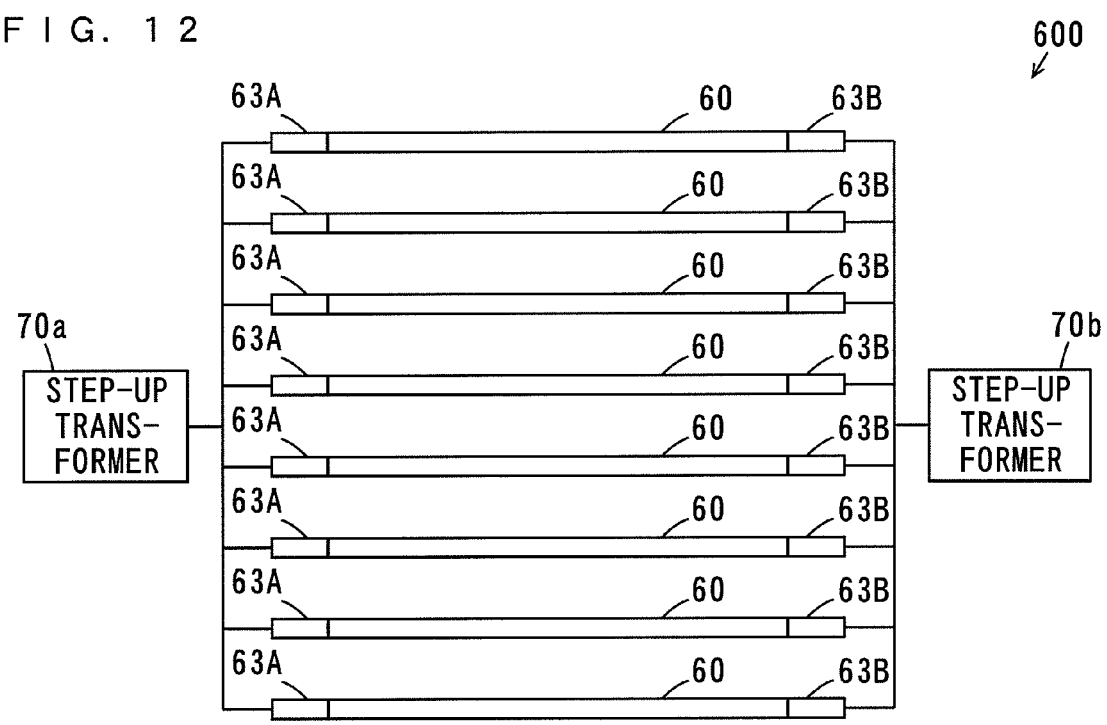
FIG. 12 is a schematic view showing the configuration of a general CCFL backlight.

FIG. 9 is a schematic view showing arrangement of the circuit boards on the back surface of the liquid crystal display device according to the third embodiment, and FIG. 10 is a block diagram showing the circuit configuration of the liquid crystal display device according to the third embodiment.

The liquid crystal display device 1C according to the third embodiment is different from the liquid crystal display device 1B according to the second embodiment in the following points.

As shown in FIG. 9, an isolation transformer 34a is provided in the power supply circuit board 3 instead of the isolation transformer 34 of the inverter board 5, and a step-up isolation transformer 58 is provided in the inverter board 5 instead of the step-up transformers 53, 54.

Note that FIG. 9 only shows the noise filter 31 and the isolation transformer 34a included in the power supply circuit board 3, the active filter 33 and the isolation step-up transformer 58 included in the inverter board 5 out of circuit elements shown in FIG. 10, described later, while the other circuit elements are not shown.

As shown in FIG. 10, the power supply circuit board 3 includes the noise filter 31, the rectifier circuit 32, the isolation transformer 34a and the DC-DC converter 35. The inverter board 5 includes the active filter 33, the drive IC 51, the switching circuit 52, the step-up isolation transformer 58 and the resonant capacitors 55, 56 for current adjustment.

Note that the configurations of the video signal processing board 4 and the EEFL backlight 6 are the same as those shown in FIG. 2.

A pair of primary terminals of the isolation transformer 34a of the power supply board 3 is connected to power supply lines L7, L8, respectively, through the connector CN34. A secondary output terminal of the isolation transformer 34a is connected to the input terminal of the DC-DC converter 35. A secondary ground terminal of the isolation transformer 34a is connected to the ground terminal of the DC-DC converter 35 and the metal chassis 2 while being connected to the ground line L0 through the connector CN32 and connected to the ground line L6 through the connector CN34.

The pair of output terminals of the active filter 33 of the inverter board 5 is connected to the pair of input terminals of the switching circuit 52, respectively, while being connected to the power supply lines L7, L8, respectively, through the connector CN51. The ground terminal of the drive IC 51 is connected to the ground line L6 through the connector CN51.

A pair of primary input terminals of the step-up isolation transformer 58 is connected to the pair of output terminals of the switching circuit 52. A pair of secondary output terminals of the step-up isolation transformer 58 is connected to the short lamp lead 81 and the long lamp lead 82 through the connectors CN52, CN53, respectively. The resonant capacitors 55, 56 are connected between the pair of output terminals of the step-up isolation transformer 58 and the ground terminal, respectively.

The switching circuit 52 performs switching power supplied from the active filter 33 based on the drive pulse Pt, and outputs voltages in opposite phase to each other to the pair of output terminals. The step-up isolation transformer 58 steps-up the voltages in opposite phase output from the pair of output terminals of the switching circuit 52, and outputs the stepped-up voltages to the short lamp lead 81 and the long lamp lead 82, respectively, as first and second drive voltages. This causes the plurality of EEFLs 60 of the EEFL backlight 6 to be driven.

(3-2) Effects of the Third Embodiment

In the liquid crystal display device 1C according to the present embodiment, power is supplied to the video signal processing board 4 by the isolation transformer 34a on the power supply circuit board 3, and power is supplied to the EEFL backlight 6 by the step-up isolation transformer 58 on the inverter board 5. In this case, the isolation transformer 34a functions as a low-capacity power supply. Accordingly, the lamp leakage current I2 from the EEFL backlight 6 to the metal frame 7 flows into the step-up isolation transformer 58 on the inverter board 5, while hardly flowing into the isolation transformer 34a on the power supply circuit board 3. In this case, the step-up isolation transformer 58 is provided on the inverter board 5 outside the metal chassis 2. Therefore, even though noise occurs in the step-up isolation transformer 58, the noise is hardly applied to the video signal processing circuit 41.

The step-up isolation transformer 58 is not directly connected to the metal chassis 2. Therefore, the noise occurring in the step-up isolation transformer 58 is prevented from being applied to the AC lines LA, LB of the noise filter 31 as the AC line noise through the metal chassis 2.

Since the step-up isolation transformer 58 is not provided in the power supply circuit board 3, the noise filter 31 is prevented from being affected by the leakage flux from the step-up isolation transformer 58. This prevents the noise occurring in the step-up isolation transformer 58 from being applied to the noise filter 31 as the AC line noise because of the leakage flux.

High-frequency noise caused by the switching operation of the active filter 33 is prevented from being applied to the noise filter 31 as the AC line noise, because the active filter 33 is not provided in the power supply circuit board 3.

The video signal processing circuit 41 of the video signal processing board 4 is prevented from being affected by the leakage currents from the lamp leads 81, 82 to the metal frame 2.

As a result, appearance of noise in video displayed on the screen of the liquid crystal display panel 1a by the video signal processing circuit 41 is prevented.

In the liquid crystal display device 1B according to the foregoing second embodiment, power conversion is performed in two steps by the isolation transformer 34 and the step-up transformers 53, 54 on the inverter board 5. In contrast, power conversion is performed in one step by the step-up isolation transformer 58 on the inverter board 5 in the liquid crystal display device 1C according to the present embodiment. This increases conversion efficiency from the AC voltage to the output voltage of the inverter board 5.

Also in the present embodiment, the inverter main board 501 and the inverter sub-board 502 in the liquid crystal display device 100A of FIGS. 13 and 14 are combined into the common inverter board 5, and the inverter board 5 includes the one switching circuit 52. Moreover, the power supply cable 900 for supplying power to the inverter sub-board 502 of FIG. 14 is not necessary. Furthermore, the cable and the connectors CN530, CN560 for supplying the drive pulse Pt from the drive IC 510 of FIG. 14 to the switching circuit 522 of the inverter sub-board 502 is not necessary. As described above, the reduced number of components allows cost reduction of the components.

(4) Other Embodiments

In the liquid crystal display devices 1A, 1B according to the first and second embodiments, one step-up transformer with a pair of output terminals may be provided in the inverter board 5 instead of the two step-up transformers 53, 54.

In the liquid crystal display device 1C according to the third embodiment, two step-up isolation transformers may be provided in the inverter board 5 instead of the one step-up isolation transformer 58.

In the liquid crystal display device 1B according to the second embodiment, the active filter 33 and the isolation transformer 34 may be provided outside the metal chassis 2 and the inverter board 5. For example, another circuit board may be arranged in a position, which is outside the metal chassis 2, on the metal frame 7, and the active filter 33 and the isolation transformer 34 may be provided on the circuit board.

In the liquid crystal display device 1C according to the third embodiment, the active filter 33 may be provided outside the metal chassis 2 and the inverter board 5. For example, another circuit board may be arranged in a position, which is outside the metal chassis 2, on the metal frame 7, and the active filter 33 may be provided on the circuit board.

(5) Correspondences between Elements in the Claims and Parts in Embodiments

In the following paragraphs, non-limiting examples of correspondences between various elements recited in the claims below and those described above with respect to various preferred embodiments of the present invention are explained.

In the above-described embodiments, the liquid crystal panel module 1 is an example of a liquid crystal panel module, the EEFL backlight 6 is an example of a backlight, the EEFL 60 is an example of a fluorescent lamp, the external electrodes 63A, 63B are examples of first and second external electrodes, the metal frame 7 is an example of a conductive frame, and the metal chassis 2 is an example of a conductive chassis.

The power supply circuit board 3 is an example of a first circuit board, the video signal processing board 4 is an example of a second circuit board, the inverter board 5 is an example of a third circuit board, and the connectors CN52, CN53 are examples of first and second output terminals.

The noise filter 31 is an example of a noise elimination circuit or a noise filter, the rectifier circuit 32 is an example of a rectifier circuit, the active filter 33 is an example of a smoothing circuit or an active filter, the isolation transformer 34 or the isolation transformer 34a is an example of a first transformer, the DC-DC converter 35 is an example of a voltage converter, the video signal processing circuit 41 is an example of a panel driving circuit, the switching circuit 52 is an example of a switching circuit, the step-up transformers 53, 54 or the step-up isolation transformer 58 is an example of a second transformer.

The power supply voltage V0 is an example of a first internal voltage, the power supply voltage Vc is an example of a second internal voltage, and the pulsating flow output from the active filter 33 is an example of a smoothed voltage.

As each of various elements recited in the claims, various other elements having configurations or functions described in the claims can be also used.

INDUSTRIAL APPLICABILITY

The present invention is applicable to display of video.

The invention claimed:

1. A liquid crystal display device comprising:
   a liquid crystal panel module including a liquid crystal display panel and a backlight;
   a first circuit board that receives an external voltage from an external power supply through a power supply line;
   a second circuit board connected to said liquid crystal display panel;
   a third circuit board including first and second output terminals connected to said backlight;
   a rectifier circuit that rectifies said external voltage;
   a smoothing circuit that smoothes the voltage rectified by said rectifier circuit by switching operation;
   a first transformer that converts the voltage smoothed by said smoothing circuit into a first internal voltage;
   a voltage converter that converts said first internal voltage into a second internal voltage that is lower than the first internal voltage;
   a switching circuit that performs switching on the first internal voltage produced by said first transformer or the voltage smoothed by said smoothing circuit;
   a second transformer that converts an output voltage of said switching circuit into first and second drive voltages to cause the first and second drive voltages to be output from said first and second output terminals; and
   a panel drive circuit that is provided in said second circuit board and is operable by said second internal voltage to cause video to be displayed on said liquid crystal display panel, wherein
   said first and second output terminals are connected to said backlight through first and second conductor wires, respectively, and
   said rectifier circuit and said voltage converter are provided in said first circuit board, said switching circuit and said second transformer are provided in said third circuit board, and said smoothing circuit and said first transformer are provided in either said first circuit board or said third circuit board.

2. The liquid crystal display device according to claim 1, wherein said liquid crystal panel module includes a conductive frame at least on its back side,
   a conductive chassis is arranged on a back side of said conductive frame,
   said first circuit board and said second circuit board are arranged on said conductive chassis,
   said third circuit board is arranged in a position, which is different from a position of said conductive chassis, on the back side of said conductive frame, and
   said conductive chassis is connected to said conductive frame, a ground terminal of said first circuit board and a ground terminal of said second circuit board are connected to said conductive chassis, and a ground terminal of said third circuit board is connected to said conductive frame.

3. The liquid crystal display device according to claim 1, further comprising a noise elimination circuit that eliminates noise of said power supply line, wherein said noise elimination circuit is provided in said first circuit board.

4. The liquid crystal display device according to claim 3, wherein said noise elimination circuit includes a noise filter having a capacitance connected between said power supply line and a ground terminal of said first circuit board.

5. The liquid crystal display device according to claim 1, wherein said smoothing circuit includes an active filter.

6. The liquid crystal display device according to claim 1, wherein said smoothing circuit and said first transformer are provided in said first circuit board, and
   said switching circuit performs the switching on the first internal voltage produced by said first transformer.

7. The liquid crystal display device according to claim 1, wherein said smoothing circuit and said first transformer are provided in said third circuit board, and
   said switching circuit performs the switching on the first internal voltage produced by said first transformer.

8. The liquid crystal display device according to claim 1, wherein said first transformer is provided in said first circuit board, said smoothing circuit is provided in said third circuit board, and
   said switching circuit performs the switching on the voltage smoothed by said smoothing circuit.

9. The liquid crystal display device according to claim 1, wherein said first and second conductor wires are arranged along a surface of said conductive frame, a length of said second conductor wire is longer than a length of said first conductor wire, and a distance between said second conductor wire and said conductive frame is set larger than a distance between said first conductor wire and said conductive frame such that a capacitance value formed between said first conductor wire and said conductive frame is equal to a capacitance value formed between said second conductor wire and said conductive frame.

10. The liquid crystal display device according to claim 1, wherein said first and second conductor wires are arranged along a surface of said conductive frame, a length of said second conductor wire is longer than a length of said first conductor wire, and first and second capacitive components are connected between said first output terminal and said conductive frame and between said second output terminal and said conductive frame, respectively, such that a capacitance value formed between said first conductor wire and said conductive frame is equal to a capacitance value formed between said second conductor wire and said conductive frame.

11. The liquid crystal display device according to claim 1, wherein said backlight includes a plurality of fluorescent lamps having first and second external electrodes, said first external electrodes of said plurality of fluorescent lamps are connected to said first output terminal through said first conductor wire, and said second external electrodes of said plurality of fluorescent lamps are connected to said second output terminal through said second conductor wire.

* * * * *